June 24, 1941.  P. H. BURNELL  2,246,835
FEEDING DEVICE FOR SHAKER CONVEYERS
Filed Feb. 17, 1940  3 Sheets-Sheet 1
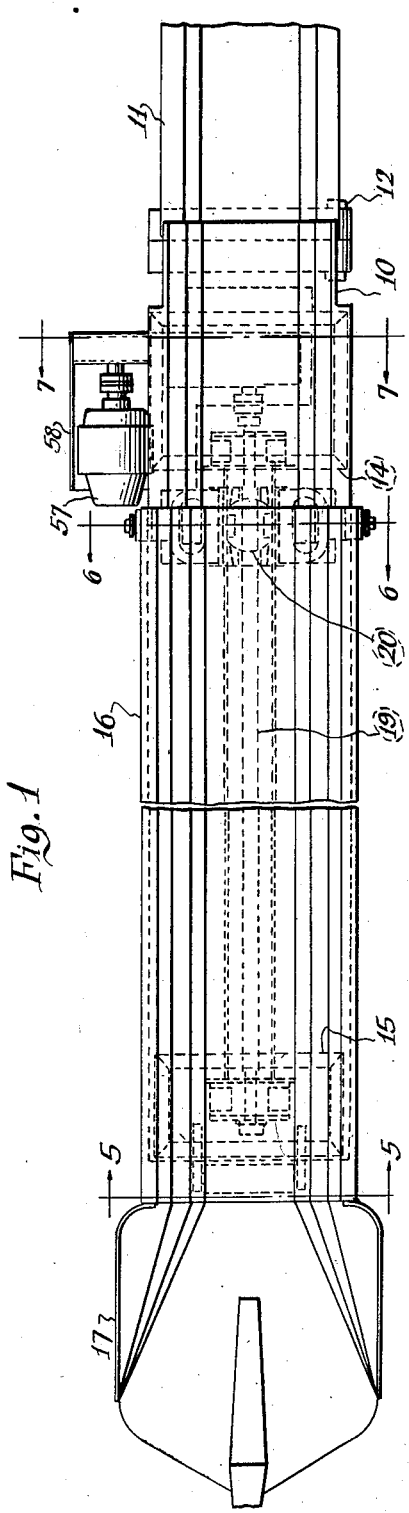
INVENTOR
Patrick H. Burnell
BY Clarence F. Poole
ATTORNEY June 24, 1941.  P. H. BURNELL  2,246,835
FEEDING DEVICE FOR SHAKER CONVEYERS
Filed Feb. 17, 1940  3 Sheets-Sheet 2
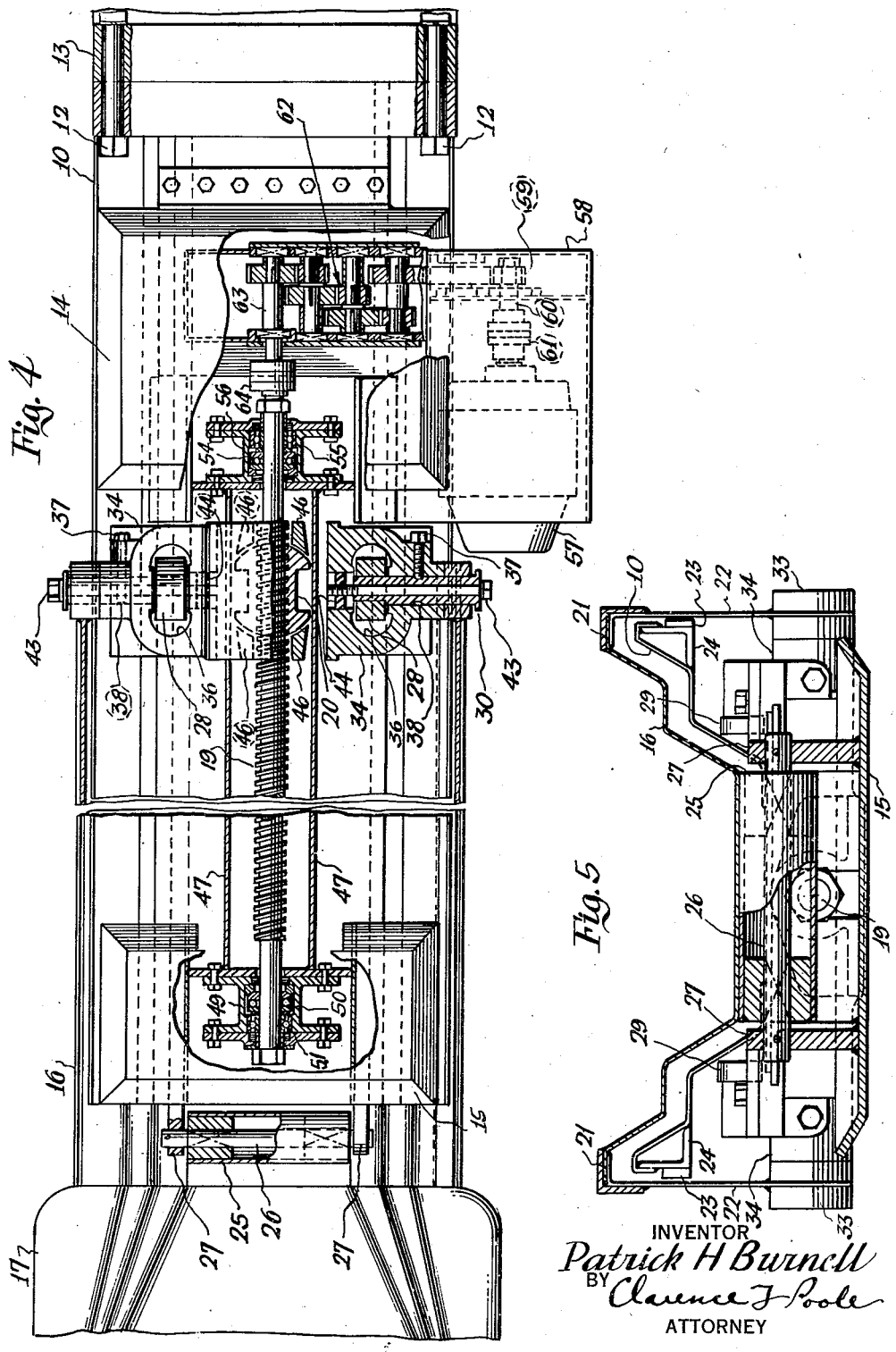
INVENTOR
Patrick H Burnell
BY Clarence F Poole
ATTORNEY

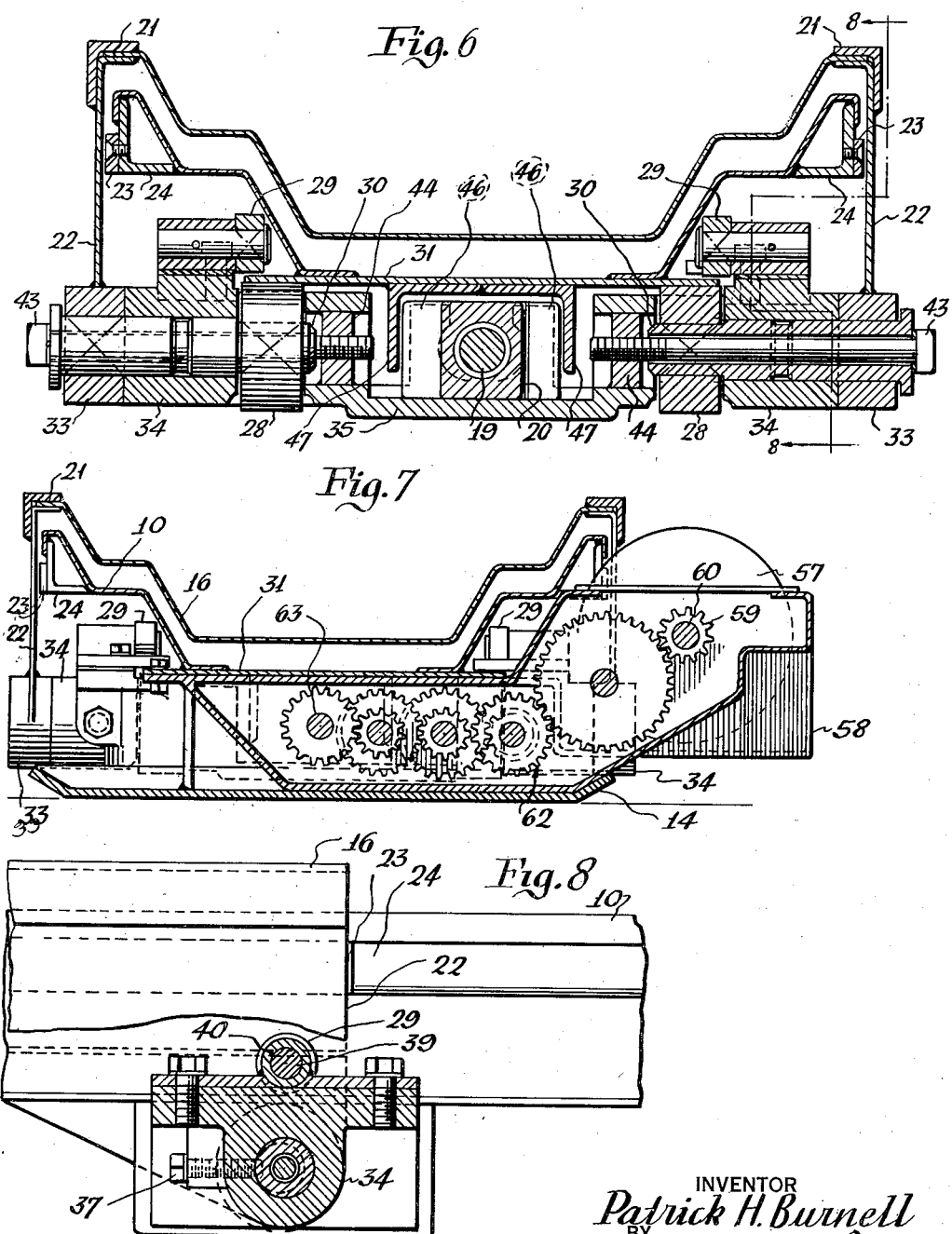

Patented June 24, 1941

2,246,835

UNITED STATES PATENT OFFICE 2,246,835

FEEDING DEVICE FOR SHAKER CONVEYERS

Patrick H. Burnell, Gebo, Wyo., assignor to Goodman Manufacturing Company, Chicago, Ill., a corporation of Illinois Application February 17, 1940, Serial No. 319,473

11 Claims. (Cl. 198—220)

This invention relates to improvements in feeding devices for shaker conveyers and has among other objects to provide an improved and novel form of feeding means operable independently of the action of the conveyer, for positively feeding an extensible trough section and shovel with respect to a reciprocating trough section of a shaker conveyer trough line, including a rotatably driven threaded member disposed beneath and connected with the reciprocating trough, together with a novel form of connection from said threaded member to the extensible trough section, for rectilinearly moving said extensible trough section upon rotation of said threaded member.

Another object of my invention is to provide a new and improved form of mounting for the reciprocating trough section and threaded member, together with a novel form of supporting and guiding connection between the reciprocating and extensible trough sections, to permit more ready extension or retraction of said extensible trough section with respect to said reciprocating trough section.

A prior Patent No. 1,967,921 shows a feeding mechanism for shaker conveyers operating on principles somewhat similar to those of my present invention. My present invention, however, differs from my prior invention in that one rotatable screw is used instead of two stationary screws, and in that a different form of arrangement for supporting the reciprocating trough section for movement along the ground, and for supporting and guiding the extensible trough section for movement along the reciprocating trough section, is provided.

Other objects of my invention will appear from time to time as the following specification proceeds and with reference to the accompanying drawings wherein:

Figure 1 is a plan view of a feeding device constructed in accordance with my invention;

Figure 2 is an enlarged view in side elevation of the device shown in Figure 1, with the extensible trough section in a retracted position and with certain parts broken away and certain other parts shown in longitudinal section;

Figure 3 is a view in side elevation of the device shown in Figure 1, drawn to a reduced scale, showing the extensible trough section in a fully extended position;

Figure 4 is a bottom view of the device shown in Figure 1, with certain parts broken away and certain other parts shown in horizontal section;

Figure 5 is a transverse sectional view taken substantially along line 5—5 of Figure 1;

Figure 6 is a transverse sectional view taken substantially along line 6—6 of Figure 1;

Figure 7 is a transverse sectional view taken substantially along line 7—7 of Figure 1; and Figure 8 is an enlarged detail view showing certain details of the guiding connection between the extensible and reciprocating trough sections.

In the embodiment of my invention illustrated in the drawings, a reciprocating trough section 10 is shown as being connected to the inby end of a shaker conveyer pan line 11 by means of connecting bolts 12, 12, in the usual manner. Said shaker conveyer pan line may be reciprocably driven by any well known type of driving mechanism (not shown) so as to cause movement of material towards the outby end thereof, upon reciprocable movement thereof.

The reciprocating trough section 10 is mounted on a supporting shoe 14 adjacent its rear end, for reciprocable movement along the ground, and on another supporting shoe 15 adjacent its forward end. Said last mentioned shoe is likewise adapted to rest on and form a slidable support for the forward end of said reciprocating trough section along the ground.

An extensible trough support 16, having a forwardly projecting shovel 17, is adapted to be nested within said reciprocating trough section, and extended therefrom or retracted therein by means of a longitudinally extending rotatable threaded member or screw 19. Said screw is disposed beneath and extends longitudinally along the central portion of said reciprocating trough section. A nut 20 is threaded on said screw and has operative connection with said extensible trough section in a manner which will hereinafter more clearly appear, for moving said extensible trough section rectilinearly along said reciprocating trough section, upon rotation of said screw. The details of construction and bearing support for said screw and nut and the drive to said screw will hereinafter more clearly appear as this specification proceeds.

The upper outer ends of the sides of the extensible trough section 16 project laterally therefrom and form flanged portions therefor, as is indicated by reference characters 21, 21. A pair of spaced apart connecting and guiding members 22, 22 are secured to and depend from said flanged portions, adjacent the rear end of said trough section. Said connecting and guiding members extend downwardly along opposite sides of said reciprocating trough section and are adapted to engage bearing or guide strips 23, 23, mounted on the outer sides of angles 24, 24, which are secured to the outer upper sides of said reciprocating trough section. Said connecting and guiding members also form a means for connecting the nut 20 with said extensible trough section.

A supporting connection is provided between the forward end of said reciprocating trough section and said extensible trough section. Said connection includes a transversely extending roller 25 herein shown as being journaled on a shaft 26, which is mounted at its opposite ends in brackets 27, 27. Said brackets project forwardly and upwardly from the forward end of the shoe 15 (see Figures 2 and 5).

Spaced apart lower rollers 28, 28 and upper rollers 29, 29 form a means for guiding the rear end of said extensible trough section for movement along said reciprocating trough section. The rollers 28, 28 are mounted on the inner ends of sleeves 30, 30, and are adapted to engage the underside of a plate 31 which, as herein shown, forms the bottom of the reciprocating trough section 10 and projects laterally beyond the sides of said trough section (see Figure 6). Each sleeve 30 is mounted on a boss 33, herein shown as being welded on the lower end of one of the guiding and connecting members 22. Said sleeves extend inwardly through said bosses and through bracket members 34, 34 projecting laterally from a transversely extending plate 35. Said plate and bracket members may be an integral casting or frame. As herein shown, said bracket members each have an inner open end 36, which extends around the associated roller 28 (see Figure 4).

The portion of the sleeve 30 upon which the roller 28 is mounted is reduced and eccentric of the portion of said sleeve extending through the boss 33 and bracket member 34, to permit adjustment of said roller by turning said sleeve in said boss, to maintain the desired spacing between the rollers 28 and 29. Said sleeves are held in the various desired positions of adjustment by set screws 37, 37. Said set screws are threaded in the bracket members 34, 34 and are adapted to engage grooves 38, 38, formed in said sleeves.

The rollers 29, 29 are adapted to engage and support the rear end of the extensible trough section 16 for movement along the upper sides of the extensions from the bottom plate 31. Said rollers are mounted on shafts 39, 39, which project inwardly from brackets 40, 40. Said brackets project upwardly from and are mounted on the upper sides of the bracket members 34, 34. An adjustable supporting and guiding connection is thus provided between the extensible and reciprocating trough sections, to permit free movement of said extensible trough section along said reciprocating trough section.

The connection between the nut 20 and the extensible trough section 16 includes a pair of threaded members 43, 43, herein shown as being bolts which extend through the sleeves 30, 30. Said bolts are threaded at their inner ends in members 44, 44 which are herein shown as being secured to the bracket members 34, 34 and plate 35. The upper side of the plate 35 engages the bottom of the nut 20, to prevent turning movement thereof, and said plate is provided with a plurality of spaced apart upright members 46, 46 extending upwardly along and engaging opposite ends of said nut, on opposite sides of the shaft 19, to cause said plate and extensible trough to move along the threaded shaft 19, upon movement of said nut along said shaft (see Figure 4). A channelled guide formed from a pair of facing angles 47, 47, secured to the underside of the bottom plate 31, is provided to form a guide for said nut along said reciprocating trough section.

The threaded shaft 19 is journaled at its forward end in a bearing support member 49, on a thrust bearing 50 and aligned radial bearing 51. Said bearing support member is mounted in the framework for connecting the shoe 15 to the bottom of the reciprocating trough section 10 (see Figures 2 and 4). The rear end of said threaded shaft is journaled in a thrust bearing 54 and an aligned radial bearing 55, mounted in a bearing support member 56. Said bearing is mounted in the framework for connecting the shoe 14 to the bottom of said reciprocating trough section. It may be seen from the foregoing that when the screw 19 is rotating, it is loaded by the nut 20 moving along said screw, which places said screw under tension regardless of its direction of rotation, and the direction of feeding movement of the extensible trough section 16.

An electric motor 57 of an ordinary construction is herein shown as being provided to rotatably drive the shaft 19. Said motor is mounted on a bracket 58 projecting laterally from the support shoe 14, adjacent one side of the reciprocating trough section 10. Said motor has driving connection with a drive pinion 59 on a longitudinal shaft 60 by means of a flexible coupling 61 (see Figures 4 and 7). A spur gear reduction train, generally indicated by reference character 62 is provided to drive a parallel shaft 63, coaxial with the shaft 19, from said drive pinion. Said last mentioned parallel shaft is operatively connected with said threaded shaft by means of a flexible coupling 64. Thus when the motor 57 is started, the threaded shaft 19 will be rotatably driven to cause rectilinear movement of the nut 20, plate 45, and extensible trough section 16 along said reciprocating trough section. Suitable control means (not shown) may be provided to control stopping or starting of said motor, and said control means may contain reversing means for reversing the direction of rotation of said motor when it is desired to reverse the direction of movement of said extensible trough section along said reciprocating trough section.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a loading device for shaker conveyers, a reciprocably driven conveyer trough line, a reciprocating trough section adapted to be secured to the forward end of said trough line and be reciprocably driven thereby, a pair of spaced shoes for supporting said reciprocating trough section for reciprocable movement along the ground, an extensible trough section having a gathering shovel on the forward end thereof, said extensible trough section being mounted on said reciprocating trough section for extensible movement with respect thereto, and means operable independently of reciprocation of said conveyer trough line for extending said extensible trough section with respect to said reciprocating trough section including a threaded member extending longitudinally of said reciprocating trough section, beneath the bottom thereof, power means for rotatably driving said threaded member, a nut mounted on said threaded member and guided for movement along the underside of said reciprocating trough section, and a connection from said nut to said extensible trough section for causing said extensible trough section to move relative to said reciprocating trough section upon rotation of said threaded member.

2. In a loading device for shaker conveyers, a reciprocably driven conveyer trough line, a reciprocating trough section adapted to be secured to the forward end of said trough line and be reciprocably driven thereby, a pair of spaced shoes for supporting said reciprocating trough section for reciprocable movement along the ground, an extensible trough section having a gathering shovel on the forward end thereof, said extensible trough section being mounted on said reciprocating trough section for extensible movement with respect thereto, and means operable independently of reciprocation of said conveyer trough line for extending said extensible trough section with respect to said reciprocating trough section including a single threaded member disposed beneath and extending longitudinally of said reciprocating trough section and journaled at its ends in said shoes, power means on said rear shoe for rotatably driving said threaded member, and a connection from said threaded member to said extensible trough section, for moving said extensible trough with respect to said reciprocating trough section.

3. In a loading device for shaker conveyers, a shaker conveyer trough line, a reciprocating trough section projecting forwardly therefrom, a pair of spaced shoes for supporting said reciprocating trough section for reciprocable movement along the ground, an extensible trough section having a gathering shovel on the forward end thereof, said extensible trough section being mounted on said reciprocating trough section for extensible movement with respect thereto, and means for extending said extensible trough section with respect to said reciprocating trough section including a single threaded member disposed beneath and extending longitudinally along the longitudinal center of said reciprocating trough section, and journaled at its ends in said shoes, power means mounted on said rear shoe for rotatably driving said threaded member, and a connection from said threaded member to said extensible trough section, for moving said extensible trough section with respect to said reciprocating trough section including a nut mounted on said threaded member and guided for movement along the underside of said reciprocating trough section and guiding members depending from opposite sides of said extensible trough section and being operatively connected with said nut.

4. In a loading device for shaker conveyers, a reciprocably driven conveyer trough line, a reciprocating trough section adapted to be secured to the forward end of said trough line and be reciprocably driven thereby, an extensible trough section adapted to be nested within or extended from said reciprocating trough section and having a shovel projecting forwardly from its forward end, and means operable independently of reciprocation of said conveyer trough line for extending said extensible trough section from or nesting it within said reciprocating trough section including a threaded member mounted beneath said reciprocating trough section, a connection between said threaded member and extensible trough section for rectilinearly moving said extensible trough section upon rotation of said threaded member, power driven means for rotatably driving said threaded member, to extend or retract said extensible trough section with respect to said reciprocating trough section, and means for supporting said reciprocating trough section for reciprocable movement along the ground including a pair of spaced apart bearing shoes at the forward and rear ends of said reciprocating trough section, said shoes forming a bearing support means for opposite ends of said threaded member.

5. In a loading device for shaker conveyers, a reciprocating trough section, an extensible trough section adapted to be nested within or extended from said reciprocating trough section and having a shovel projecting forwardly from its forward end, a threaded member mounted beneath said reciprocating trough section, a connection between said threaded member and extensible trough section for rectilinearly moving said extensible trough section upon rotation of said threaded member, power driven means for rotatably driving said threaded member, to extend or retract said extensible trough section with respect to said reciprocating trough section, the bottom of said reciprocating trough section projecting laterally beyond the sides thereof, and a supporting connection between said reciprocating and extensible trough sections including a pair of laterally spaced rollers adapted to engage the underside of the laterally projecting portions of said bottom of said reciprocating trough section and another pair of laterally spaced rollers adapted to engage the top side of the laterally projecting portion of the bottom of said reciprocating trough section.

6. In a loading device for shaker conveyers, a reciprocating trough section, an extensible trough section adapted to be nested within or extended from said reciprocating trough section and having a shovel projecting forwardly from its forward end, a threaded member mounted beneath said reciprocating trough section, a connection between said threaded member and extensible trough section for rectilinearly moving said extensible trough section upon rotation of said threaded member, power driven means for rotatably driving said threaded member, to extend or retract said extensible trough section with respect to said reciprocating trough section, means for supporting said reciprocating trough section for reciprocable movement along the ground including a pair of spaced apart ground engaging bearing shoes adjacent the forward and rear ends of said reciprocating trough section, and means for supporting said extensible trough section for free movement along said reciprocating trough section including a roller projecting forwardly of said forwardmost shoe and adapted to engage the underside of said extensible trough section and two pairs of opposed rollers at the rear end of said extensible trough section adapted to engage said reciprocating trough section above and below a portion thereof.

7. In a loading device for shaker conveyers, a reciprocating trough section, an extensible trough section adapted to be nested within or extended from said reciprocating trough section and having a shovel projecting forwardly from its forward end, a pair of spaced apart ground engaging bearing shoes for supporting said reciprocating trough section for reciprocable movement along the ground, a roller projecting forwardly of said forwardmost shoe, for supporting the forward end of said extensible trough section for movement along said reciprocating trough section, two pairs of opposed rollers connected to and disposed adjacent the rear end of said extensible trough section and adapted to engage said reciprocating trough section above and below a portion thereof, a nut having connection with said extensible trough section, and a threaded member disposed beneath said reciprocating trough section and journaled in said shoes, said threaded member having said nut threaded thereon for extending or retracting said extensible trough section upon rotation of said screw.

8. In a loading device for shaker conveyers, a reciprocating trough section, an extensible trough section adapted to be nested within or extended from said reciprocating trough section, a threaded member disposed beneath and extending longitudinally of said reciprocating trough section, a motor for rotatably driving said threaded member, a nut threaded on said threaded member and guided for movement along said reciprocating trough section, and an operative connection from said nut to said extensible trough section for extending or retracting said extensible trough section including a pair of guiding members depending from opposite sides of said extensible trough section and adapted to have guiding engagement with said reciprocating trough section, and an operative connection between said guiding members and nut.

9. In a loading device for shaker conveyers, a reciprocating trough section, an extensible trough section adapted to be nested within or extended from said reciprocating trough section, a threaded member disposed beneath and extending longitudinally of said reciprocating trough section, a motor for rotatably driving said threaded member, a nut threaded on said threaded member and guided for movement along said reciprocating trough section, and an operative connection from said nut to said extensible trough section for extending or retracting said extensible trough section upon rectilinear movement of said nut including a pair of guiding members depending from opposite sides of said extensible trough section and adapted to have guiding engagement with said reciprocating trough section, and an operative connection between said guiding members and nut including a frame member extending across the bottom of said reciprocating trough section, and adapted to engage said nut to prevent rotation thereof, an operative connection between said nut and frame member, and operative connections between opposite ends of said frame member, and said guide members.

10. In a loading device for shaker conveyers, a reciprocating trough section, an extensible trough section adapted to be nested within or extended from said reciprocating trough section, a threaded member disposed beneath and extending longitudinally of said reciprocating trough section, a motor for rotatably driving said threaded member, a nut threaded on said threaded member and guided for movement along said reciprocating trough section, and an operative connection from said nut to said extensible trough section for extending or retracting said extensible trough section upon rectilinear movement of said nut including a pair of guiding members depending from opposite sides of said extensible trough section and adapted to have guiding engagement with said reciprocating trough section, a frame member extending across the bottom of said reciprocating trough section, an operative connection between said nut and frame member, connections between opposite ends of said frame member and said guide members, and a supporting connection between said reciprocating trough section and said guide members including two pairs of opposed rollers mounted on said guiding members and adapted to engage said reciprocating trough section above and below a portion thereof.

11. In a loading device for shaker conveyers, a reciprocating trough section, an extensible trough section adapted to be nested within or extended from said reciprocating trough section, a threaded member disposed beneath and extending longitudinally of said reciprocating trough section, a motor for rotatably driving said threaded member, a nut threaded on said threaded member and guided for movement along said reciprocating trough section, and an operative connection from said nut to said extensible trough section for extending or retracting said extensible trough section upon rectilinear movement of said nut including a pair of guiding members depending from opposite sides of said extensible trough section and adapted to have guiding engagement with said reciprocating trough section, a frame member extending across the bottom of said reciprocating trough section, an operative connection between said nut and frame member, connections between opposite ends of said frame member and said guide members, said guide members each having a roller connected thereto and adapted to engage the bottom of said reciprocating trough section, and other rollers adapted to engage said reciprocating trough section above said first mentioned rollers and support said extensible trough section for movement along said reciprocating trough section.

PATRICK H. BURNELL.